R. T. GRIFFITH.
AIR BAG.
APPLICATION FILED APR. 24, 1915.
1,163,908.
Patented Dec. 14, 1915.
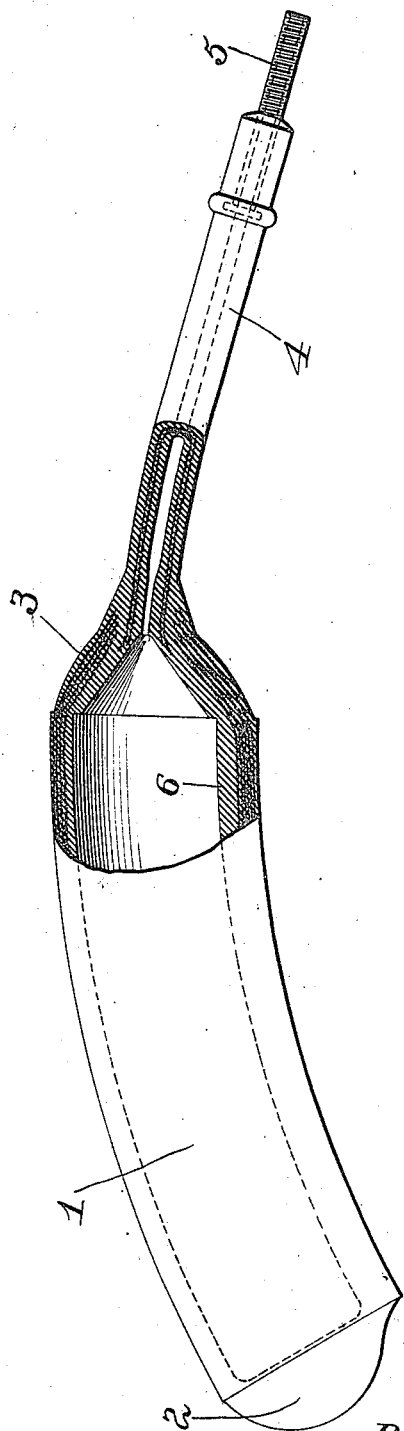
Inventor:
Richard T. Griffith,
by Charles E Parsons
Atty.

UNITED STATES PATENT OFFICE.

RICHARD T. GRIFFITH, OF AKRON, OHIO, ASSIGNOR TO MILLER RUBBER COMPANY, OF AKRON, OHIO, A CORPORATION OF OHIO.

AIR-BAG.

1,163,908.

Specification of Letters Patent. Patented Dec. 14, 1915.

Application filed April 24, 1915. Serial No. 23,717.

*To all whom it may concern:*

Be it known that I, RICHARD T. GRIFFITH, citizen of the United States, residing at Akron, in the county of Summit and State of Ohio, have invented certain new and useful Improvements in Air-Bags, of which the following is a specification.

The present invention relates to improvements in air bags such as are adapted to be placed within a tire when a patch is to be vulcanized thereon.

The object of the present invention is to provide an air bag of the type above referred to having its main body portion and stem formed as an integral structure.

Heretofore the body of the air bag has been formed and the stem or inflation tube made separately and attached thereto. The disadvantage of this form is that a weak joint is formed where the stem unites with the main body of the bag. It has been customary to wrap the stem with wire at the end attached to the body of the air bag. This gives a practically rigid connection with the heavy air bag body at one side and a long flexible tube at the other. The result of such a connection between the air bag and its stem is that unless the bag is always carefully handled there is a danger of breaking the stem off at this point.

The present invention contemplates forming the air bag and stem as an integral structure having a reinforced portion provided at the point which has heretofore been the weakest place.

The invention is illustrated in the accompanying drawing, which shows an elevation of the improved form of air bag with a part shown in broken section.

Referring more particularly to the drawing, the body of the bag 1 is shaped to conform to the cross section of a tire in which it is adapted to be placed for the purpose of repairing or vulcanizing a patch thereon. These bags may be made of any desired size to fit corresponding sized tires and may vary in length according to the size of the patch for which they are intended to be used. One end of the bag is shown to be closed and rounded as at 2, while from the opposite end the reinforced tapering portion 3 is provided terminating in the stem 4 which is provided at its outer end with a threaded member 5, adapted to be attached to a pump or other air supply source.

The bag is constructed by forming an inner tubular member closed at one end of suitable rubber coated fabric shown at 6. The stem 4 which is provided with a disk shaped flap is firmly secured to one end of the tube thus formed and a plurality of layers of fabric are then wrapped around the whole as shown by the sectional view in the drawing. The carcass is then placed within a mold conforming exactly in size and shape to the finished article and a sufficient amount of rubber vulcanized over the same to form a complete unitary finished article. By properly designing the mold a thickened reinforced portion 3 is provided at the juncture of the stem 4 and end of the air bag body 1. This reinforcement makes a substantially rigid connection between the stem and body of the bag so that there is no connection here between two parts which would be subject to breakage from rough handling or excessive use. A bag formed in this manner can easily be picked up and carried around by means of the stem without danger of breaking it away from the body of the bag. It is frequently of advantage to handle the bag in this manner, especially in removing it from the tire which is being repaired or in carrying it from place to place. Great difficulty was experienced with the former type of air bag having the stem attached separately at one end but all of these difficulties have been overcome by the present device and a simpler, stronger and more durable air bag is provided. Though not necessary, it is of advantage to use a larger stem or tube 4 than has heretofore been the practice, because greater strength can be obtained by having the thickened, reinforced portion 3, merge into a tube whose walls are comparatively thick and thus become a mere reduced continuation of the tapered end of the air bag body 1.

What I claim is:—

1. An air bag comprising a body portion, a stem integral therewith and a reinforced portion at the junction of said stem and body portion, substantially as described.

2. An air bag comprising a body portion having an outer casing of flexible material, a stem of similar material integral therewith, and a reinforcing portion connecting the body and the stem, substantially as described.

In testimony whereof I affix my signature in presence of two witnesses.

RICHARD T. GRIFFITH.

Witnesses:
C. A. WOLF,
FRED C. THEISS.